United States Patent
Yokoyama et al.

[11] Patent Number: 5,312,085
[45] Date of Patent: May 17, 1994

[54] CONTROL VALVE

[75] Inventors: Ikuo Yokoyama; Yasunori Kuroki, both of Nobeoka, Japan

[73] Assignee: Asahi Yukizai Kogyo Co., Ltd., Nobeoka, Japan

[21] Appl. No.: 962,584
[22] PCT Filed: May 20, 1992
[86] PCT No.: PCT/JP92/00642
§ 371 Date: Dec. 30, 1992
§ 102(e) Date: Dec. 30, 1992
[87] PCT Pub. No.: WO93/23690
PCT Pub. Date: Nov. 25, 1993
[51] Int. Cl.$^5$ ............................................. F16K 47/08
[52] U.S. Cl. ........................................ 251/121; 251/120
[58] Field of Search ................ 251/121, 122, 124, 120

[56] References Cited

U.S. PATENT DOCUMENTS

| | | | |
|---|---|---|---|
| 1,538,207 | 5/1925 | Niedecken | 251/122 X |
| 2,685,294 | 8/1954 | Gold et al. | 251/122 X |
| 3,572,629 | 3/1971 | Clark | 251/121 |
| 4,335,737 | 6/1982 | Power | 251/122 X |
| 4,355,784 | 10/1982 | Cain | 251/121 X |
| 4,413,645 | 11/1983 | Seabase et al. | 251/120 X |
| 4,477,054 | 10/1984 | Danby et al. | 251/122 |

FOREIGN PATENT DOCUMENTS

| | | |
|---|---|---|
| 1263964 | 5/1961 | France ........................... 251/121 |
| 42-21903 | 12/1967 | Japan . |
| 45-13010 | 6/1970 | Japan . |
| 56-77906 | 6/1981 | Japan . |
| 57-110367 | 7/1982 | Japan . |
| 59-34073 | 2/1984 | Japan . |
| 62-194075 | 8/1987 | Japan . |
| 62-202571 | 12/1987 | Japan . |
| 63-37578 | 10/1988 | Japan . |
| 2-3026 | 1/1990 | Japan . |
| 3-117176 | 12/1991 | Japan . |

Primary Examiner—Stephen M. Hepperle
Attorney, Agent, or Firm—Burns, Doane, Swecker & Mathis

[57] ABSTRACT

The present invention provides a control valve with an improved closing function that functions over a long period of time and the flow rate control can be carried out over a wide range.

A valve body (1) is provided inside thereof with a partition (4) separating an inlet passage (2) and an outlet passage (3). The partition (4) is provided with an opening portion (5) communicating the inlet passage (2) and the outlet passage (3).

A shutoff valve (10) is disposed opposite the opening portion (5). The diameter of the opening portion (5) is increased and curves toward the side of the shutoff valve (10).

A control plug (12) is arranged on and projected from the lower end of the shutoff valve (10); said control plug being located on the large diameter side of the opening portion (5), is coaxial with the opening portion (5), and has a flange portion (12a) defining an orifice (14) between the inner surface of the opening portion (5) and the flange portion. The shutoff valve is movable up and down and allows the lower end (11) thereof to abut against a valve seat portion (15) formed on the periphery of the opening portion (5).

6 Claims, 8 Drawing Sheets

CONTROL VALVE

TECHNICAL FIELD

The present invention relates to a control valve used in a fluid transporting pipe line for adjusting the flow rate, and more particularly to a control valve having an opening and closing function in addition to the flow rate adjusting function for a fluid being transported.

BACKGROUND ART

Figure 13:
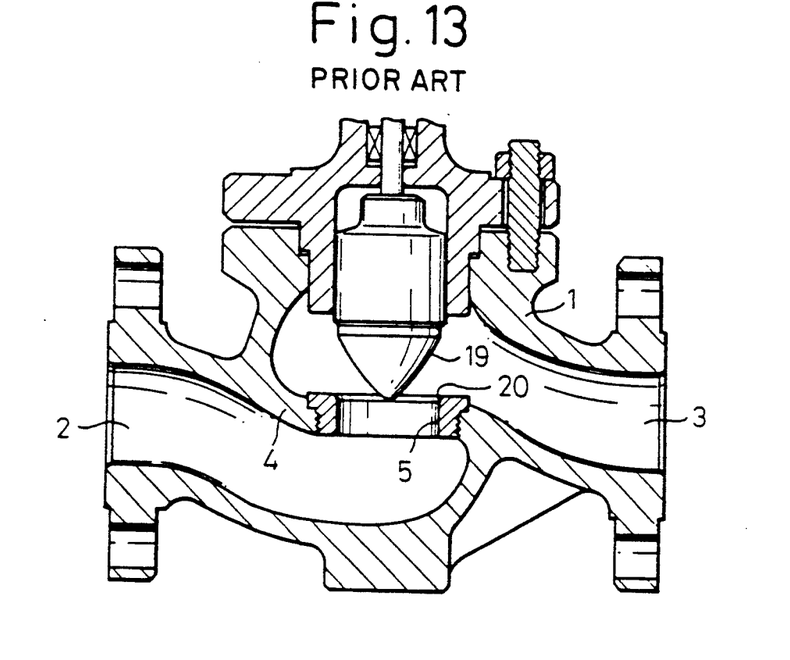
FIG. 13 is a longitudinal section of the conventional control valve.

A control valve in the prior art, for example, as shown in FIG. 13, has the problem that, when controlling at a low opening range, i.e., at the lower limit of the valve rangeability, if the flow rate of a fluid is controlled, a valve plug and a valve seat are locally eroded by the cavitation of the fluid occurring owing to a variation of a pressure condition in the front and rear of the valve, and the amount of fluid leakage on the valve closing is increased by the above cavitation, and thus precise control is difficult, consequently, the control valve fails to operate.

Accordingly, various proposals aimed at preventing fluid leakage owing to the occurrence of the cavitation when the valve is closed have been made. Among the above proposals, an example is disclosed in Japanese Unexamined Patent Publication No. 59-34073. The control valve disclosed in the above publication is designed such that a valve plug having two large and small barrels is provided so as to move up and down in relation to an inner hole comprising a small diameter portion adjacent to a valve seat and a vertical wall portion larger than the small diameter portion, and an increased diameter portion, the hole wall of which is formed in a horn-shape spreading downward so that corrosion of the valve plug and the valve seat owing to the occurrence of the cavitation, and fluid leakage on the valve closing are prevented; also, the flow rate control is carried out in the minimum opening portion defined by the circumferential surface of the large barrel portion or the resting portion and the inner hole, according to the movement of the valve plug.

Nevertheless, in such a conventional control valve, since it is necessary to rub the resting portion and the valve seat portion by lapping so that the interface of the above portions is made conformable, there are problems in that machining is troublesome, high precision is required, and the interface is worn because of repeated opening and closing valve operations, and thus the valve fails to close.

Also, although the flow characteristics of the control valve are obtained by changing the minimum opening portion area defined by the inner hole and the valve plug, the flow characteristics corresponding to its design is not easily obtained because the valve plug is cylindrical and the configuration is liable to be subjected to resistance due to the viscosity of the fluid, and thus it is difficult to increase the range ability.

Figure 14:
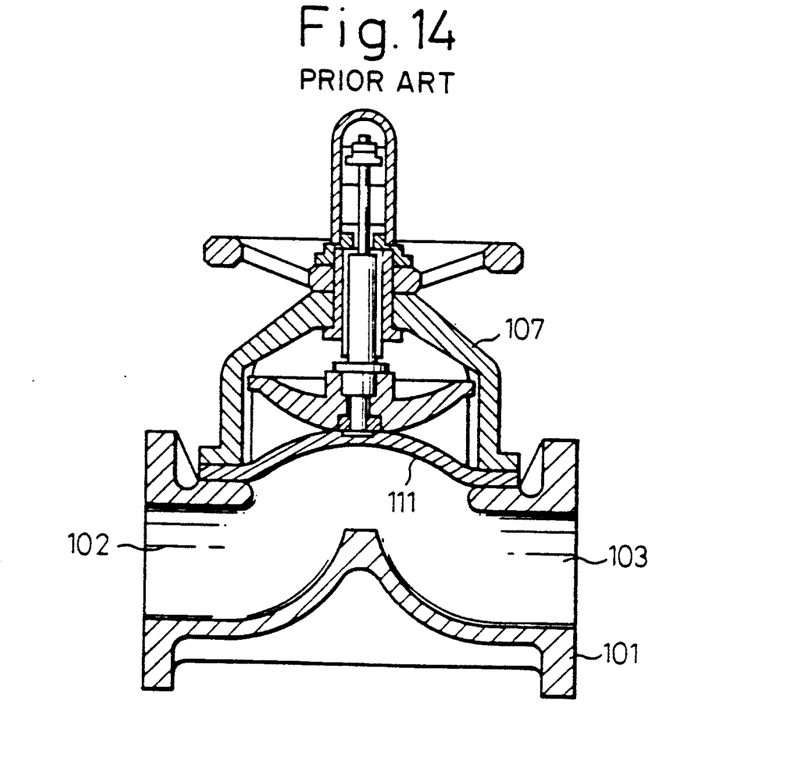
FIG. 14 is a longitudinal section of the conventional diaphragm valve.

Furthermore, the conventional diaphragm valve generally has a construction as shown in FIG. 14 of the accompanying drawings, there is no dead space in the interior of the valve when the fluid is flowing and the reliability of its fluid-stopping ability is high, and thus many diaphragm valves are used in super pure water pipe lines in the semiconductor industry to prevent the growth of bacteria, in the bio-industry in the field of medicine and cosmetics, and in all kinds of chemical pipe lines. Further, the prior arts concerning the diaphragm valves and the diaphragms themselves used in the above applications are disclosed in Japanese Examined Utility Model Publication No. 2-3026 and 63-37578, etc. Also, as a substitute for the diaphragm valve, "fluororesin bellows for bellows-seal valve" is disclosed in Japanese Examined Utility Model Publication No. 42-21903. These prior arts use superior techniques in that the growth of bacteria can be prevented as stated above and the fluid stopping ability thereof is very reliable.

Nevertheless, with the constitution of the prior art, since no consideration is given to designing the inherent flow characteristics of the valve, a similar percentage of characteristics or linear flow characteristics essential to general automatic control valves cannot be obtained according to the design. Thus, if one intends to carry out automatic control, such as PID control, the controlling-ability is very poor, and in particular, the conventional control valves are not suitable for special process lines requiring precision, and even in general process lines, hunting occurs and thus the control valves often fail to operate and control. Further, it is natural for the controllable range of the flow rate to be limited since the rangeability is very small. Also, if the control valve is used in a low opening range, a rapid pressure drop occurs under certain conditions and cavitation is brought about. Thus, the possibility of the valve plug portion and the valve seat portion being damaged is high, thereby reducing the reliability of the fluid stop ability thereof.

DISCLOSURE OF THE INVENTION

The present invention has been conceived to solve the problems of the conventional technique as stated above and the purpose of this invention is to provide a control valve with an improved closing function that can operate for extended periods and the flow rate control can be carried out over a wide range.

Another object of the present invention is to provide a control valve such that various predesigned valve flow characteristics can be easily and precisely obtained, the rangeability can be increased, the cavitation can be prevented from occurring, and the long life reliability of the fluid stopping ability of the valve can be improved.

A further object of the present invention is to provide a control valve having no deadspace, which is a merit of the conventional diaphragm valve, and that is very simple in construction.

According to the present invention, in order to achieve the above objects, there is provided a control valve comprising a valve body having inside thereof inlet and outlet passages, a partition disposed between the inlet and outlet passages for curving the flow direction, and an opening portion provided on the partition for communicating the inlet passage with the outlet passage; wherein a shutoff valve is disposed opposite the opening portion; the opening portion has an increased diameter and curves toward the shutoff valve; a control plug is arranged and projected on and from the lower end of the shutoff valve; the control plug is positioned on the large diameter side of the opening portion, is coaxial with the axis of the opening portion, and has a flange portion defining an orifice with the inner surface of the opening portion; the shutoff valve being movable up and down and so as to allow the lower end thereof to abut against a valve seat portion formed on the periphery of the opening portion.

According to a preferred embodiment of the present invention, the shutoff valve is a diaphragm or bellows type.

According to another preferred embodiment, the control plug consists of a barrel portion and a flange portion provided on the tip portion of the barrel portion; the section shape of the flange portion is a combination of a square and a trapezoid, and when the diameter of the barrel portion is $D_1$, the maximum diameter of the flange portion is $D_2$, the thickness of the maximum diameter portion of the flange portion is t, and the inclination connecting the maximum diameter portion of the flange portion and the barrel portion is $\theta$, the control plug is shaped such that the following relationship is realized at the same time.

$$0.1 \leq D_1/D_2 \leq 0.7$$

$$0 < t/D_2 \leq 0.15$$

$$0° \leq \theta \leq 45°$$

BEST MODE OF CARRYING OUT THE INVENTION

Embodiments of the present invention will be explained with reference to the drawings.

Figure 1:
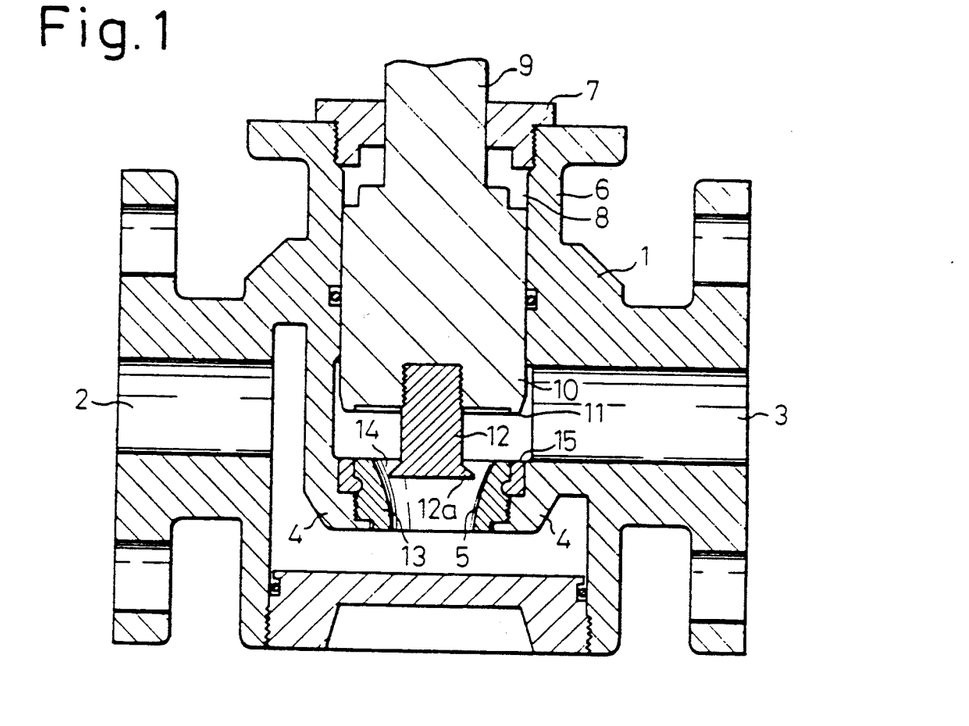
FIG. 1 is a longitudinal section showing an embodiment of a control valve according to the present invention.

FIG. 1 is a longitudinal section showing an embodiment of the present invention, wherein numeral 1 is a valve body provided inside thereof with a partition 4 separating an inlet passage 2 and an outlet passage 3; the partition 4 defining a curved flow passage between the inlet and outlet passages 2 and 3. Inside the valve body 1, a valve chest 8 perpendicular to the axes of the inlet passage 2 and the outlet passage 3 is formed, and a cylindrical shutoff valve 10 is disposed in the valve chest 8.

The partition 4 is provided with an opening portion 5 communicating the inlet passage 2 and the outlet passage 3; the opening portion 5 being formed by penetrating a flow diminishing pipe 13 screwed into the partition 4. Also, the inner surface of the opening portion 5 has an increase in diameter and curves toward the shutoff valve 10.

The flow diminishing pipe 13 has an elastic valve seat portion 15 for sealing, which is fitted onto the upper and outer periphery of the flow diminishing pipe 13. The flow diminishing pipe 13 is screwed into the partition 4 so as to place the valve seat portion 15 between the partition 4 and the pipe 13. Further, in this embodiment, although the opening portion 5 is provided by screwing into the flow diminishing pipe 13 in the valve body 1, the opening portion 5 may be provided by directly perforating the partition 4.

The shutoff valve 10 is provided integrally with the lower end of a valve stem 9 held by a cap 7 fixed to the upper portion of the valve body 1, and is retained movably back and forth in the valve chest 8 having an axis corresponding to the axis of the opening 5 and formed by a neck portion 6 located on the upper portion of the valve body 1. An annular resting portion 11 capable of abutting against the valve seat portion 15 is formed on the periphery of the lower end of the shutoff valve 10.

Figure 4:
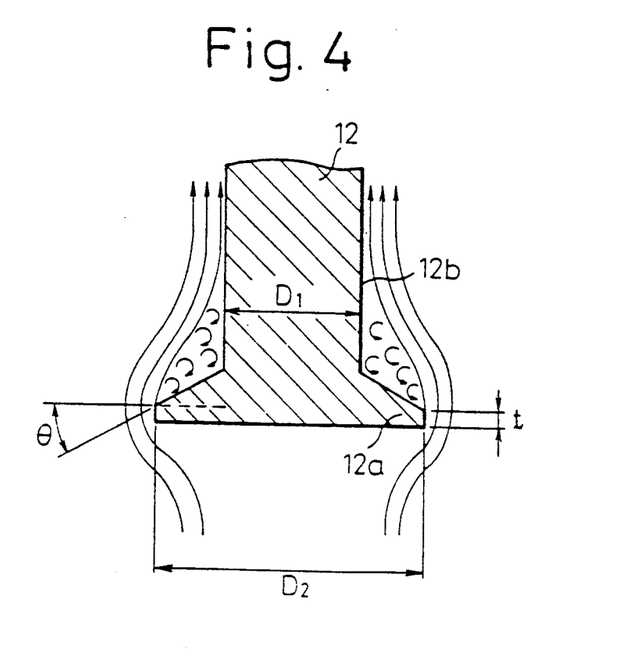
FIG. 4 is a longitudinal section of the essential parts of the control plug of the control valve in FIG. 1.

Numeral 12 is a control plug screwed into the lower end of the shutoff valve 10. The control plug 12 has an axis corresponding to the axis of the opening portion 5 and includes a flange portion 12a defining an orifice 14 between the inner surface of the opening portion 5 and the control plug 12. The control plug 12 according to this embodiment consists of a barrel portion and the flange portion 12a provided on the tip portion thereof, and the section shape of the flange portion 12a is composed of a combination of a square and a trapezoid. As shown in FIG. 4, the diameter of the barrel portion 12b is $D_1$, the maximum diameter of the flange portion 12a is $D_2$, the thickness of the maximum diameter portion of the flange portion is t, and the inclination connecting the maximum diameter portion of the flange portion and the barrel portion is $\theta$. The control plug is formed such that the following equations are realized.

$$D_1/D_2 = 0.7 \quad t/D_2 = 0.07 \text{ and } \theta = 45°$$

Further, the control plug 12 may be molded integrally with the lower end of the shutoff valve 10. Also, the shape of the flange portion 12a is not limited to this embodiment; it may be a disk-shape or an inverted truncated cone. The shape of this embodiment is an example of one of the preferred shapes.

The operation of the control valve according to this embodiment constituted as above is as follows.

In FIG. 1, the fluid admitted through the inlet passage 2 passes through the orifice defined by the opening portion 15 and the flange portion 12a of the control plug 12, and flows out to the outlet passage 3.

Here, if the shutoff valve 10 is moved toward the opening portion 5 via the valve stem 9 by actuating a drive via an automatic control or by manual operation, the control plug 12 is also moved following the movement of the shutoff valve 10. Consequently, since the area of the orifice 14 defined between the flange portion 12a of the control plug 12 and the inner surface of the opening portion 5 becomes smaller, the flow rate of the fluid decreases. Conversely, if the shutoff valve 10 is moved apart from the opening portion 5, since the area of the orifice 14 is increased by an effect inverse to the above, the flow rate of the fluid increases.

With such an operation, since the flow rate of the fluid is adjusted, the valve inherent flow characteristics designed previously can be easily obtained by changing the shape of the inner surface of the opening portion 5.

Also, in an opening state as shown in FIG. 1, as the control plug 12 is formed such that the relationship $0.1 \leq D_1/D_2 \leq 0.7$, $0 < t/D_2 \leq 0.15$, $0° \leq \theta \leq 45°$, is realized when the fluid passes through the orifice 14 as shown in FIG. 4, the stream lines of the fluid sharply generate a "break away", and thus resistance due to the viscosity of the fluid is eliminated and only pressure drag acts on the front and rear of the flange portion 12a.

Accordingly, since the flow coefficient is stabilized from the low flow velocity to the high flow velocity, the relationship between the flow rate of the fluid passing through the orifice 14 and the opening area of the orifice 14 complies with the generally conventional theoretical equation:

$$Q = \alpha \cdot A \cdot \sqrt{2gH}$$

(Q: flow rate, α: flow coefficient, A: orifice opening area, H: pressure differential in the front and rear of the orifice) Therefore, the valve inherent flow characteristics designed previously can be obtained precisely and flow rate control is permitted over a wide range, from a very small flow rate to a very large flow rate.

Figure 2:
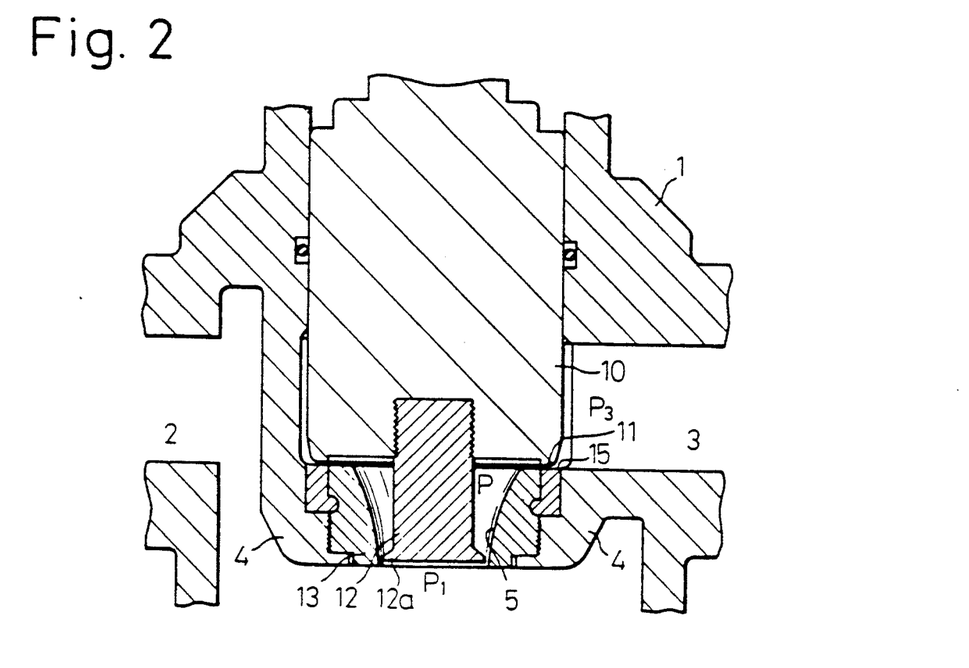
FIG. 2 is a longitudinal section of the essential parts of the control valve in FIG. 1, showing the state thereof just before closing.

On the other hand, if the shutoff valve 10 is further continued to move toward the opening portion 5 from the state in FIG. 1, the shutoff valve 10 attains the state just before closing as shown in FIG. 2.

Here, in this state, it is presumed that the pressure in the upstream side of the control plug 12 is $P_1$, the pressure in the space defined between the control plug 12 and the shutoff valve 10 is $P_2$, and the pressure in the outlet passage 3 is $P_3$. The relationship, $P_1 > P_2$, and $P_2 > P_3$, results from the relationship between $P_1$, $P_2$ and $P_3$. Presuming $P_1 - P_2 = \Delta P_1$, $P_2 - P_3 = \Delta P_2$ and $P_1 - P_3 = \Delta P_3$, it is clear that the equation, $\Delta P_3 = \Delta P_1 + \Delta P_2$ is realized.

Namely, the fluid does not bring about the pressure drop $\Delta P_3$ in one stage, but gradually brings about the pressure drop of $\Delta P_1$ and $\Delta P_2$ in two stages, and thus the occurrence of cavitation is prevented.

Figure 3:
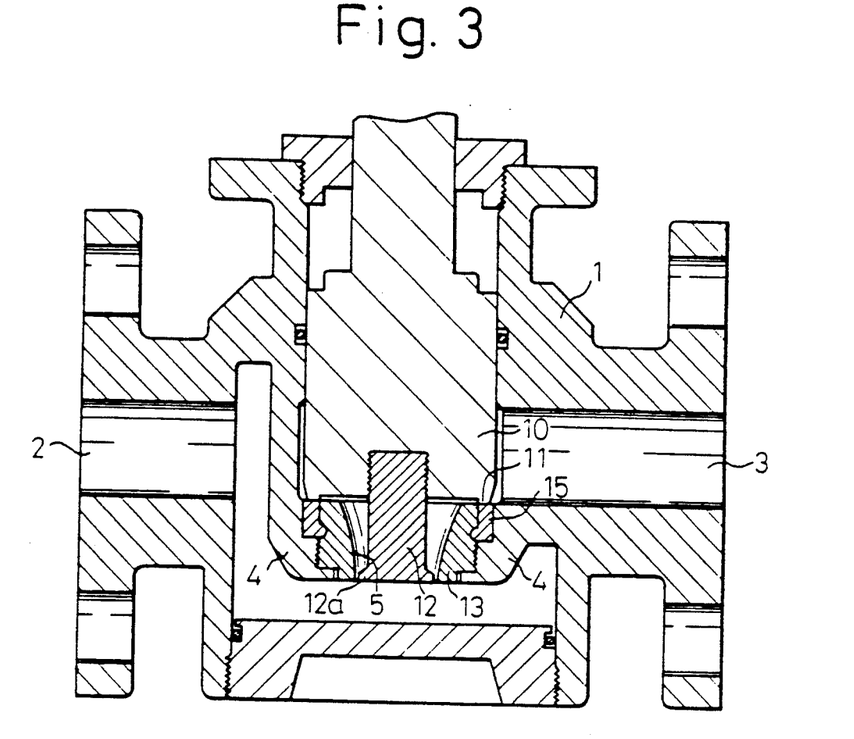
FIG. 3 is a longitudinal section showing the closed state of the control valve in FIG. 1.

If the shutoff valve 10 is further continued to move toward the opening portion 5, the shutoff valve 10 finally abuts the resting portion 11 formed on the lower end thereof against the valve seat 15 arranged on the periphery of the opening portion 5, and is pressed against the valve seat 15. Thus, since the space between the inlet passage 2 and the outlet passage 3 is completely closed, the flow of fluid is stopped and the valve attains the complete closing state.

According to the operation as stated above, the increase and the decrease of the flow rate of the fluid is adjusted and the closing of the valve is carried out.

The practical flow experiment was carried out using control valves having diameter 15A such that the control plug 12 in the control valves has six shapes, under the following conditions. Also, the conventional control valve was tested at the same time.

Condition fluid . . . water
temperature . . . 25° C.
pressure differential in the front and rear of the valve . . . 0.7 Kgf/cm²

The results are shown in the following table and in FIG. 6.

| fixed condition | | $t/D_2 = 0.15$ $\theta = 45°$ | | | $D_1/D_2 = 0.7$ $\theta = 45°$ | | | $D_1/D_2 = 0.7$ $t/D_2 = 0.15$ | |
|---|---|---|---|---|---|---|---|---|---|
| | No. | $D_1/D_2$ | max. error (%) | No. | $t/D_2$ | max. error (%) | No. | θ (degree) | max. error (%) |
| changed condition | 1 | 0.5 | 40 | 4 | 0.07 | 35 | 7 | 30 | 41 |
| | 2 | 0.7 | 43 | 5 | 0.15 | 43 | 8 | 45 | 43 |
| | 3 | 0.9 | 48 | 6 | 0.2 | 49 | 9 | 60 | 47 |

In the above table, the maximum error (%) (corresponding to $A_3$ portion in FIG. 6), from the design value (corresponding to the straight line $A_2$ in FIG. 6) in the above practical flow experiment of the control valve having a control plug such that only one factor (changing condition) is changed, is shown.

As seen from the table, No. 4 control valve (the present embodiment) shows the smallest value of 35%, and thus it is deemed that No. 4 obtains the most precise flow characteristics. No. 2, 5 and 8 control valves are the same products as No. 1, but the errors of these control valves are smaller than the maximum error of 50% of the conventional product (corresponding to $B_3$ portion in FIG. 6), thus it is judged that these conditions are superior to the conventional product.

On the other hand, No. 3, 6, and 9 control valves show values close to the conventional product, and precise flow characteristics cannot be obtained under these conditions. Namely, it is noted that if the shape of the control plug 12 is in the range, $D_1/D_2 \leq 0.7$, $0 < t/D_2 \leq 0.15$ and $0° \leq \theta \leq 45°$, the precision is especially improved compared with the conventional product.

Figure 6:
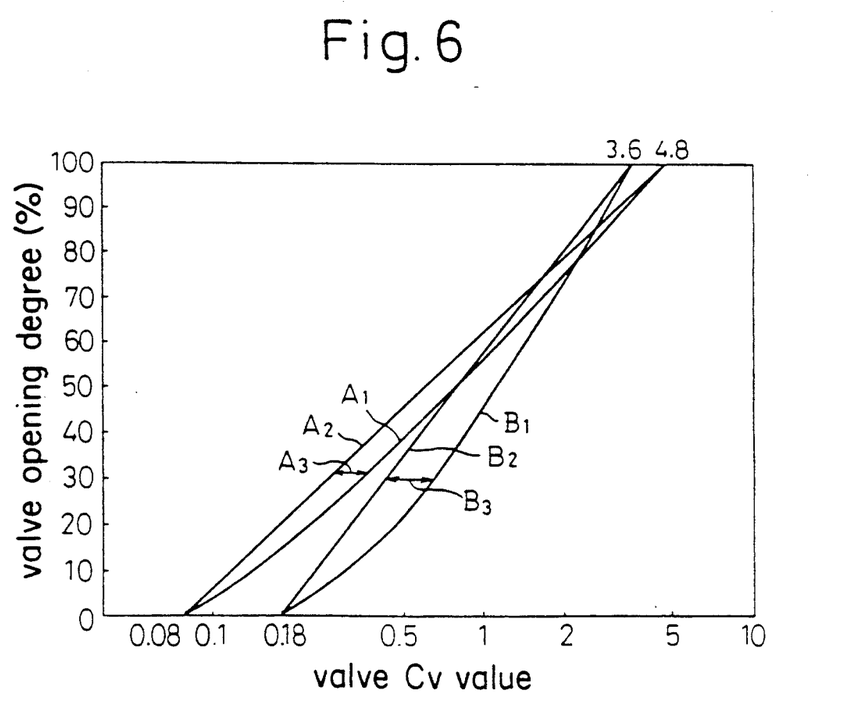
FIG. 6 is a flow characteristics diagram showing the results of the practical flow experiment of the embodiment in FIG. 1.

In FIG. 6, the table of the flow characteristics of the control valve according to the present embodiment (above No. 4) and the conventional control valve are shown. As seen in FIG. 6, the rangeability of the control valve according to the present invention (the curve $A_1$ in FIG. 6) is improved to 60:1 compared with the rangeability of 20:1 of the conventional product (the curve $B_1$ in FIG. 6), and the control valve according to the invention could be controlled over a wide range from a very small flow rate to a large flow rate. Also, the deviation from the design value (the straight line portions $A_2$, $B_2$ in FIG. 6) is small compared with the conventional product, and the flow characteristics were precisely obtained.

Figure 5:
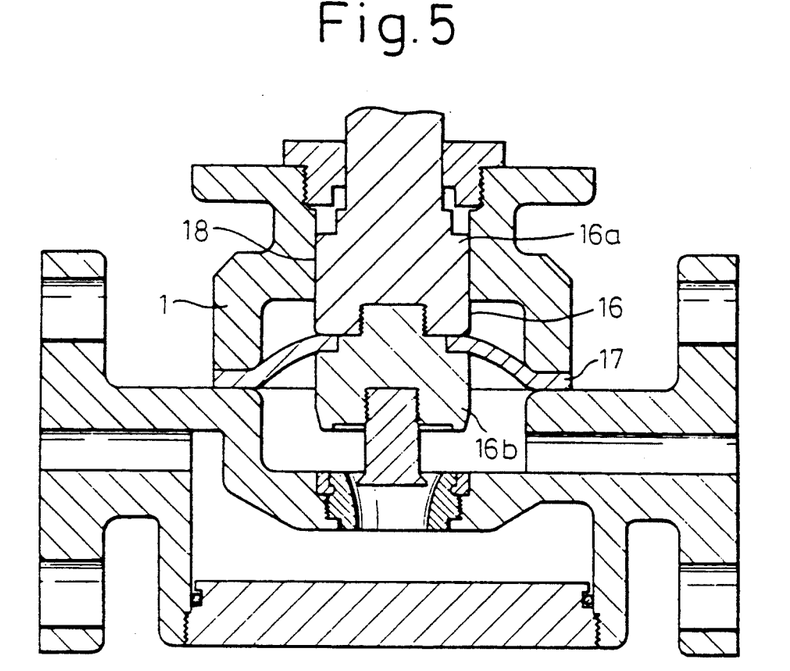
FIG. 5 is a longitudinal section of another embodiment of the present invention.

FIG. 5 is a longitudinal section of a control valve showing another embodiment of the present invention. The control valve of this embodiment has a diaphragm 17 placed between two half pieces 16a and 16b of a shutoff valve 16, and is designed as a diaphragm type control valve preventing the fluid and debris from entering the slide portion 18 between the valve body 1 and the shutoff valve 16. The control valve in FIG. 5 is the same as that in FIG. 1 with regard to the operation and effects thereof.

Figure 7:
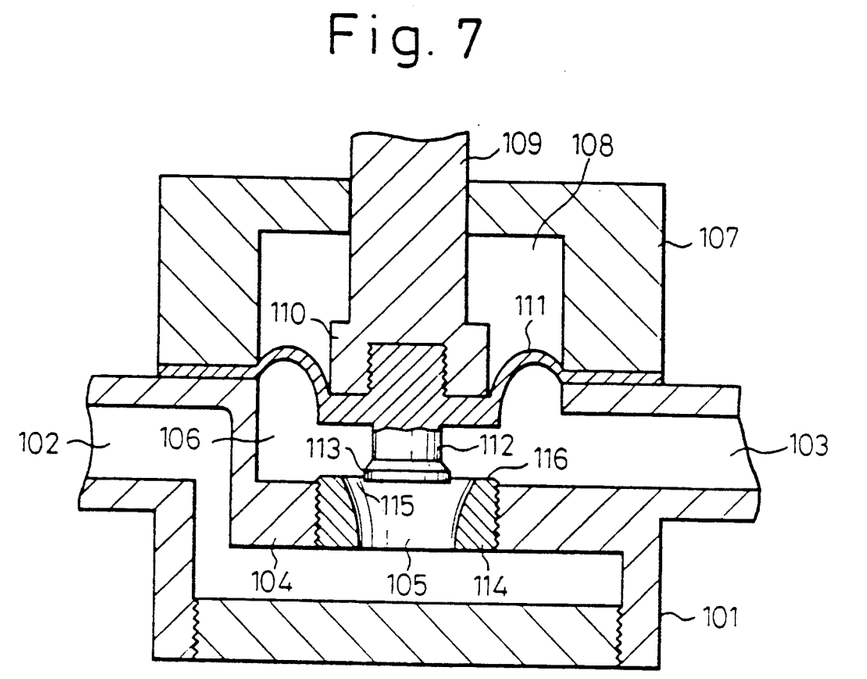
FIG. 7 is a longitudinal section of the essential parts showing a further embodiment of the present invention.

FIG. 7 is a longitudinal section of the essential parts showing a further embodiment of the present invention, and this embodiment uses a diaphragm valve as a shutoff valve.

In the Figure, numeral 101 is a valve body designed such that an inlet passage 102 and an outlet passage 103 separate each other by a partition 104 arranged inside the valve body, and the passage between the inlet passage 102 and the outlet passage 103 is curved. Inside the valve body 101, a valve chest 106 perpendicular to the flow passage axes of the flow passages 102 and 103 is arranged, and the valve chest 106 includes a control plug 112 inside thereof. Numeral 105 is an opening portion provided on the partition 104 and communicating the inlet passage 102 and the outlet passage 103. The opening portion 105 is formed inside a flow diminishing pipe 114 screwed into the partition 102. The opening portion 105 faces the control plug 112; the inner surface of the same increases in diameter and curves toward the control plug 112, and the axis of the opening portion 105 is located perpendicular to the axes of the inlet and outlet passages 102 and 103. The flow diminishing pipe 114 has a valve seat 116 on the upper end thereof. Further, in this embodiment, although the opening portion 105 is provided by screwing the flow diminishing pipe 114 into the partition 104, it may be provided by perforating the partition 104 directly. Numeral 110 is a compressor provided integrally with the lower end of a valve stem 109 held by a cap 107 fixed to the upper portion of the valve body 1. The compressor 110 is located such that the axis thereof coincides with the axis of the opening portion 105, and is held movably back and forth in a compressor chamber 108. Numeral 111 is a diaphragm of a fluoro-resin placed and fixed between the valve body 101 and the cap 107, and screwed and fixed to the lower end of the compressor 110 at the center portion thereof. The material of the diaphragm is not limited to a fluororesin, but may be made of rubber, other elastomers or metal, which is usually used. The control plug 112 is also made of a fluororesin and molded integrally with the diaphragm 111. The axis of the control plug coincides with the axis of the opening portion 105. Further, the control plug 112 includes a flange portion 113 having a section shape consisting of a combination of a square and a trapezoid and defining an orifice 115 between the inner surface of the opening portion 105 and the control plug. Further, although the control plug 112 in this embodiment is made of the same material as the diaphragm 111, it is not limited to the same material, and the control plug 112 may be provided by fixing the same made of different material to the diaphragm 111. In any case, the control plug 112 must have a degree of hardness such that the flow rate adjustment can be carried out without hindrance thereof. Although the control plug 112 of this embodiment is molded integrally with the diaphragm 111, it may be provided integrally with the diaphragm 111 by adhering, screwing or other means. Also, the shape of the flange portion 113 of the control plug 112 is not limited to this embodiment; it may be a disk shape or an inverted truncated cone shape. This embodiment shows one of the preferred shapes.

The operation of the control valve of this embodiment constituted as above is as follows. In FIG. 7, if the fluid is flushed into the valve, the fluid arriving at the opening portion 105 through the inlet passage 102 passes through the orifice 115 defined by the inner surface of the opening portion 115 and the flange portion 113, and flows out to the outlet passage 103. Here, if the diaphragm 111 moved toward the opening 105 via the valve stem 109 by the actuation of an automatic control drive or by a manual operation, the control plug 112 is also moved following the diaphragm 111. As a result of this, the opening area of the orifice 115 becomes smaller, and thus the flow rate of the fluid decreases. On the contrary, if the diaphragm 111 is moved apart from the opening portion 105, the opening area of the orifice 115 increases by an effect inverse to the above, and thus the flow rate of the fluid increases. According to such an operation, since the flow rate of the fluid is adjusted, the valve inherent flow characteristics designed previously can be easily obtained by changing the shape of the inner surface of the opening portion 105.

Also, in any opening state as shown in FIG. 7, the stream lines of the fluid sharply generate a "break away" by the flange portion 113 when the fluid passes through the orifice 115, and thus resistance due to the viscosity of the fluid is eliminated and only pressure drag acts on the front and rear of the flange portion 113. Accordingly, since the flow coefficient is stabilized over a wide range, from a low flow velocity to a high flow velocity, the relationship between the flow rate of the fluid passing through the orifice 115 and the opening area of the orifice 115 complies with the generally conventional theoretical equation;

$$Q = \alpha \cdot A \cdot \sqrt{2gH}$$

(Q: flow rate, $\alpha$: flow coefficient, A: orifice opening area, H: pressure differential at the front and rear of the orifice)

Therefore, the valve inherent flow characteristics designed previously can be obtained very precisely and flow rate control is permitted over a wide range, from a very small flow rate to a very large flow rate.

Figure 8:
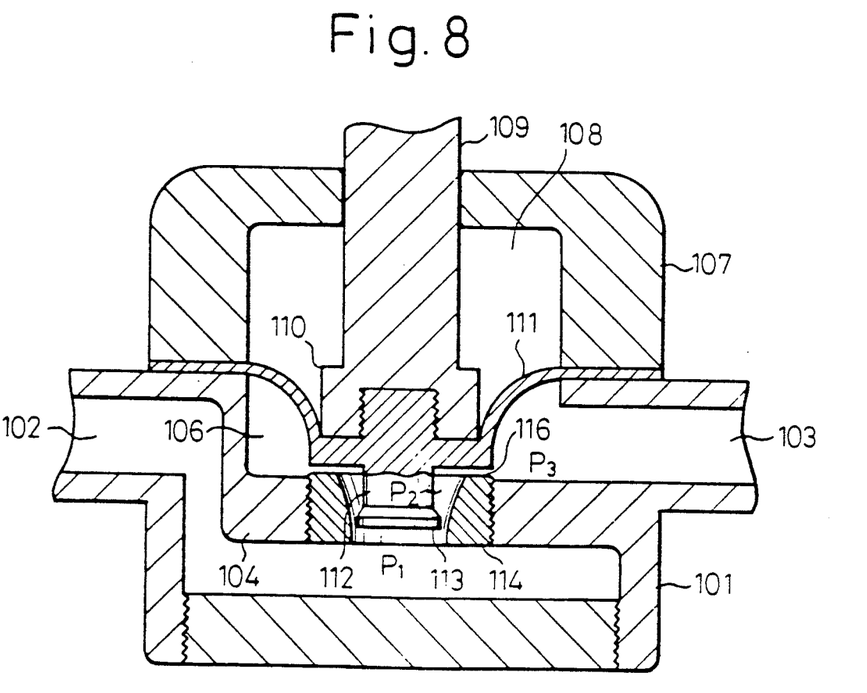
FIG. 8 is a longitudinal section of the essential parts showing the state thereof just before closing the control valve in FIG. 7.

On the other hand, if the diaphragm 111 further continues to move toward the opening portion 105, it attains a state similar to a state just before closing as shown in FIG. 8. In this situation, it is presumed that the pressure in the upstream side of the control plug 112 is $P_1$, the pressure in the space defined between the control plug 112 and the diaphragm 111 is $P_2$ and the pressure in the outlet passage 103 is $P_3$. The relationship, $P_1 > P_2$ and $P_2 > P_3$ results from the relationship between $P_1$, $P_2$ and $P_3$. Presuming $P_1 - P_2 = \Delta P_1$, $P_2 - P_3 = \Delta P_2$ and $P_1 - P_3 = \Delta P_3$, it is clear that the equation, $\Delta P_3 = \Delta P_1 + \Delta P_2$ can be realized. Namely, the fluid does not bring about the pressure drop $\Delta P_3$ in one stage, but gradually brings about the pressure drop in two stages of $\Delta P_1$ and $\Delta P_2$, and thus the occurrence of cavitation is constrained.

Figure 9:
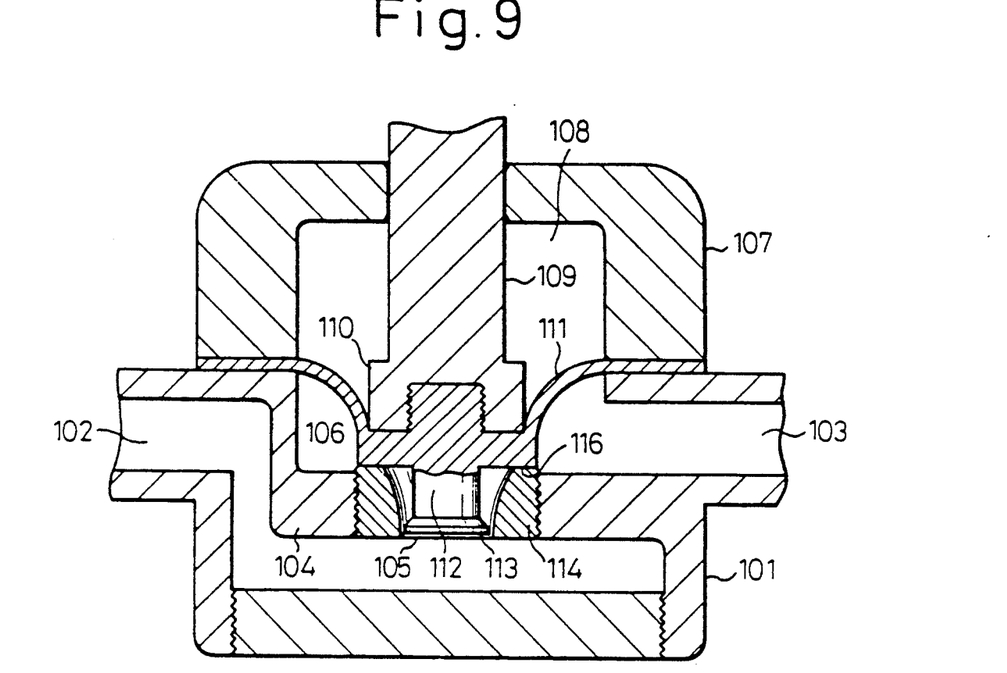
FIG. 9 is a longitudinal section of the essential parts, showing the control valve in FIG. 7 in a closed state.

If the diaphragm 111 further continues to move toward the opening portion 105, the diaphragm 111 finally abuts the valve seat portion 116 and is further pressed by the compressor 110, and thus the space between the inlet passage 102 and the outlet passage 103 is completely closed and the flow of the fluid is stopped. That is to say, the valve attains a complete closing state.

According to the operation as stated above, the increase and decrease of the flow rate of the fluid is adjusted and the valve is closed.

The practical flow experiment was carried out using a control valve having diameter 15A under the following conditions.

Figure 11:
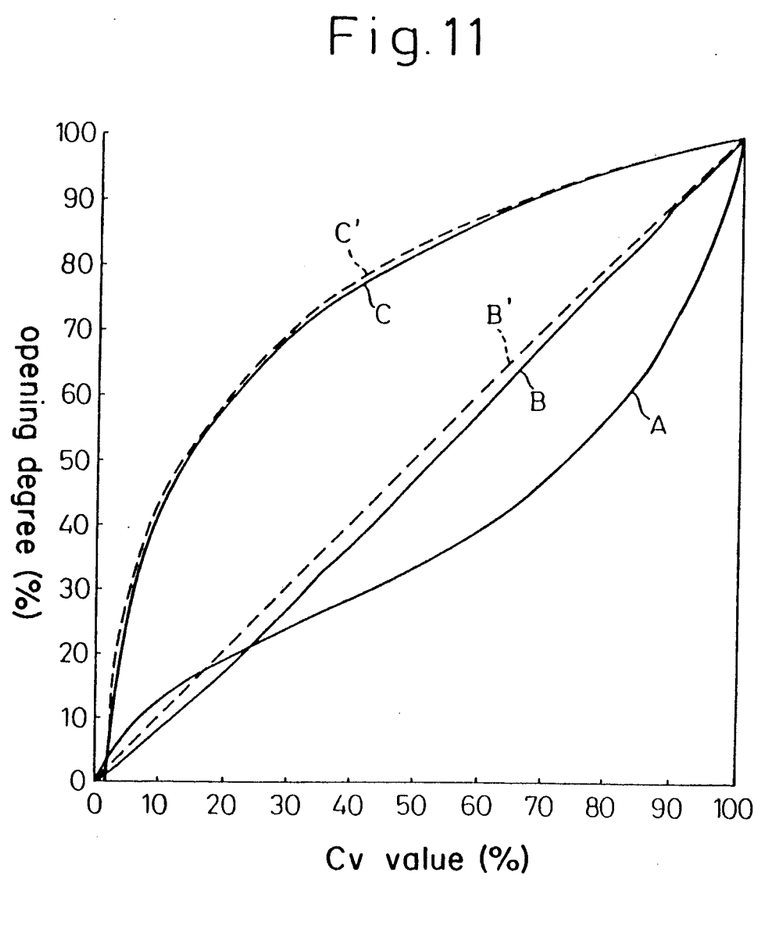
FIG. 11 is a diagram of the valve inherent flow characteristics showing the results of the practical flow experiment of the embodiment in FIG. 7.
Figure 12:
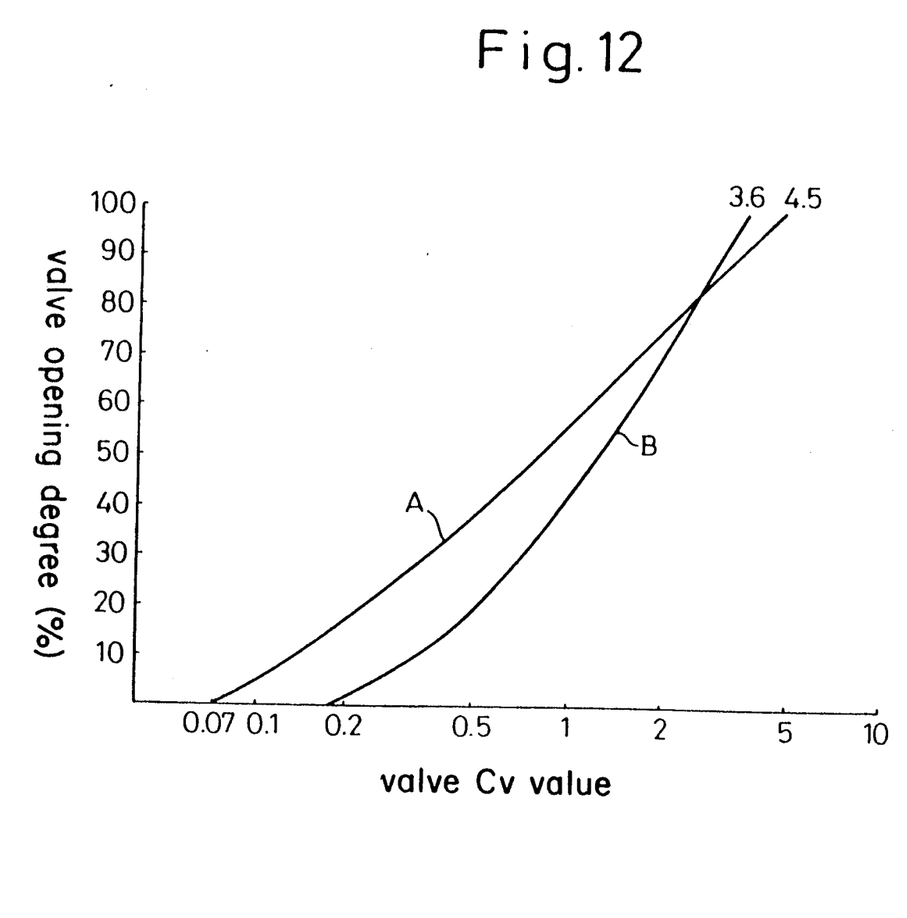
FIG. 12 is a diagram of the flow characteristics showing the results of the practical flow experiment of the same embodiment.

Condition fluid . . . water
temperature . . . 25° C.
pressure differential at the front and rear of the valve . . . 0.5–0.7 Kgf/cm$^2$ The tables of the flow characteristics resulting from the above experiment are shown in FIG. 11 and FIG. 12.

FIG. 11 shows comparative data of the valve inherent flow characteristics. A indicates the valve inherent flow characteristics of the conventional diaphragm valve, B and C indicate the valve inherent flow characteristics of this embodiment. B is an example of the linear flow characteristics and C is an example of the equal percentage flow characteristics. B' and C' shown by broken lines indicate the design values according to a theoretical calculation. Both B and C show very small deviations from the design values and thus it is noted that the required characteristics were obtained very accurately. Also, the linear flow characteristics and the equal percentage flow characteristics could be easily obtained by shaping the inner surface of the flow diminishing pipe into a curve corresponding to the specified function required.

FIG. 12 shows the result of a comparison between the automatic control valve on the market and the embodiment. The automatic control valve is used as a comparative subject because the flow characteristics of the conventional diaphragm valve is widely different from the linear or equal percentage flow characteristics required as general control characteristics and thus it is unsuitable for calculating the rangeability. Also, even if the rangeability is calculated using the conventional method of calculation, i.e., the method with the flow rate in a position such that an inflection point appears in the function during the practical flow experiment and is defined as the controllable minimum or maximum flow rate value in relation to the theoretical flow characteristics in which the relationship between the valve opening degree percent and Cv percent complies with the specified function, the rangeability is too small and thus it is feared that a misunderstanding with respect to the products being sold at present may occur. As noted in this Figure, the rangeability of this embodiment is widely improved from 20:1 to 60:1 compared with the automatic control valve on the market.

Figure 10:
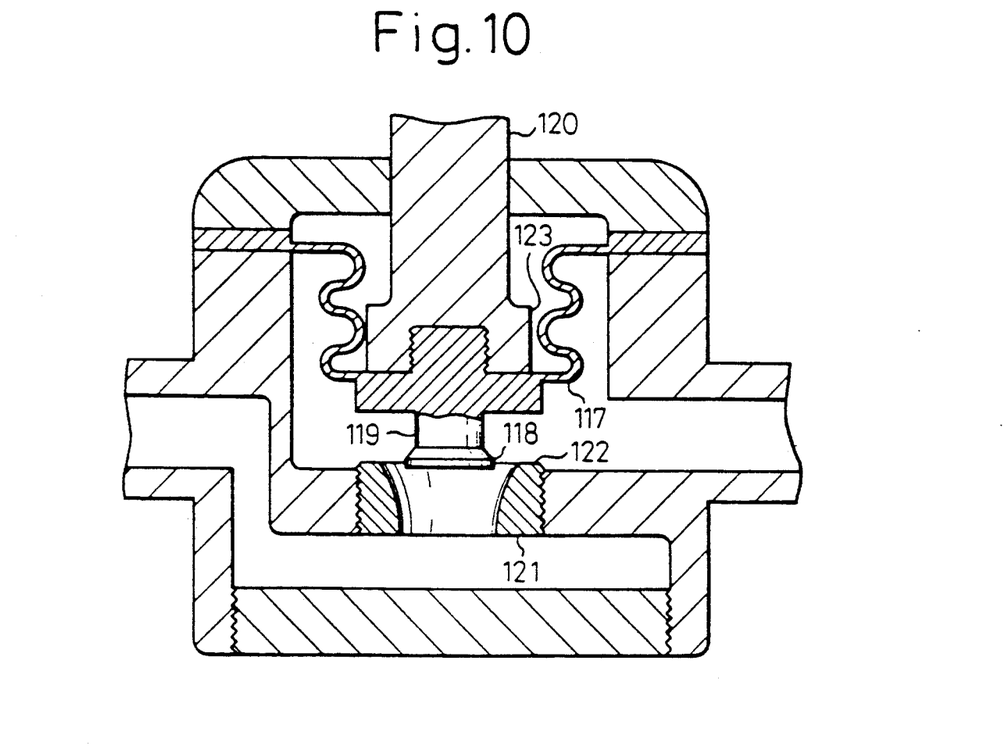
FIG. 10 is a longitudinal section of the essential parts showing a yet further embodiment of the present invention.

FIG. 10 is a longitudinal section of the essential parts of a control valve showing a yet further embodiment of the present invention. The control valve of this embodiment uses a bellows-like diaphragm as a substitute for the diaphragm 111 in FIG. 7. In this Figure, numeral 117 is a bellows-like diaphragm of a fluororesin, on the lower end of which a control plug 119 including a flange portion 118 at the lower end thereof is integrally provided; the flange portion of which has a section shape composed of a combination of a square and a trapezoid. The operation of the control plug 119 is carried out by the up and down motion of a valve stem 120. Also, the closing of the valve is carried out by moving the valve stem 120 in the valve closing direction, abutting the lower end of the bellows-like diaphragm 117 on a valve seat portion 122 of a flow diminishing pipe 121 and further pressing the diaphragm by a compressor 123. The other operation is omitted because it is the same as the case in FIG. 7.

With the construction of this embodiment, the moving range of the control plug can be enlarged compared with the usual diaphragms, and the valve system can be made compact since the diameter of the compressor chamber can be small.

The control valve according to the present invention has the following merits.

(1) Since the control plug is formed in a shape not subjected to resistance due to the viscosity of the fluid, precise flow characteristics are obtained and can be controlled over a wide range, from a very small flow rate to a large flow rate.

(2) Since the cavitation in the valve seat portion and the resting portion is prevented from occurring, the valve seat and resting portions are never eroded, leakage of the fluid when the valve is closed can be prevented, and thus the durability of the control valve itself can be improved. Also, since the occurrence of cavitation in the control plug and the opening portion can be prevented, precise control is permitted over a long period of time.

(3) Since there are no tapering resting portions and valve seat portions requiring difficult machining, fitting or the like, the control valve can be provided easily and inexpensively.

(4) The control valve can be controlled over a wide range from a very small flow rate to a large flow rate. That is, the range thereof can be widened.

(5) Since the control valve has a constitution such that the shape of the inner surface of the opening portion can change, all kinds of valve inherent flow characteristics can be easily designed and manufactured depending on the applications thereof.

(6) The control valve has the effect that no dead space exists when the fluid flows, the reliability of the valve closing ability is high, and the occurrence of dust is prevented since there is no mechanically sliding portion.

EXPLOITATION IN INDUSTRY

The present invention is preferably applicable for a super pure water piping line in the semiconductor industry and all kinds of chemical pipe lines.

What is claimed is:

1. A control valve comprising a valve body having, inside thereof, an inlet passage, an outlet passage, a partition disposed between the inlet passage and the outlet passage that curves the flow direction, and an opening portion provided on the partition and communicating the inlet passage and the outlet passage; and a shutoff valve disposed opposite the opening portion; wherein the opening portion increases in diameter and curves toward the shutoff valve side; a control plug is arranged on and projected from the lower end of the shutoff valve; said control plug being located on the large diameter side of the opening portion, is coaxial with the axis of the opening portion, and has a flange portion defining an orifice between the inner surface of the opening portion and the flange portion; the shutoff valve is movable up and down and allows the lower end thereof to abut against a valve seat portion formed on the periphery of the opening portion.

2. A control valve as set forth in claim 1, wherein the shutoff valve is cylinder-like and is supported in the valve body movably up and down.

3. A control valve as set forth in claim 1, wherein the shutoff valve is a diaphragm.

4. A control valve as set forth in claim 1, wherein the shutoff valve is a bellows-like diaphragm type.

5. A control valve as set forth in claim 1, wherein the control plug consists of a barrel portion and a flange portion provided on the tip portion thereof; the section shape of the flange portion is composed of a combination of a square and a trapezoid, and shaped such that the relationship of $0.1 \leq D_1/D_2 \leq 0.7$, $0 < t/D_2 \leq 0.15$ and $0° \leq \theta \leq 45°$, is realized at the same time, where it is presumed that the diameter of the barrel portion is $D_1$, the maximum diameter of the flange portion is $D_2$, the thickness of the maximum diameter portion of the flange portion is t, and the inclination connecting the maximum diameter portion of the flange portion and the barrel portion is $\theta$.

6. A control valve, comprising:
a valve body having an inlet passage, an outlet passage, and a partition disposed between the inlet passage and the outlet passage that curves the flow direction;
an opening portion extending through the partition so as to connect the inlet passage with the outlet passage;
a shutoff valve disposed opposite the opening portion for closing said opening portion;
said opening portion being defined by a curve of revolution that increases in diameter toward the shutoff valve side;
a control plug arranged on and projecting from said shutoff valve;
said control plug being arranged on the large diameter side of said opening portion and is coaxial with an axis of said opening portion;
a flange arranged on said control plug so as to define an orifice between the opening portion and the flange;
a valve seat formed externally to said opening portion; and
said shutoff valve having a lower end and is movable up and down so as to allow the lower end of the shutoff valve to selectively contact and separate from the valve seat.

* * * * *